US009321918B2

(12) United States Patent
Desio et al.

(10) Patent No.: US 9,321,918 B2
(45) Date of Patent: Apr. 26, 2016

(54) STAIN-RESISTANT ARTICLES

(75) Inventors: Glenn P. Desio, Marietta, GA (US); Amy Marie Cuevas, Atlanta, GA (US); Linda M. Norfolk, Cumming, GA (US); Geert J. Verfaillie, Parike (BE); Nancy J. Singletary, Alpharetta, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 0 days.

(21) Appl. No.: 13/878,950

(22) PCT Filed: Oct. 13, 2011

(86) PCT No.: PCT/EP2011/067898
§ 371 (c)(1),
(2), (4) Date: Apr. 11, 2013

(87) PCT Pub. No.: WO2012/049252
PCT Pub. Date: Apr. 19, 2012

(65) Prior Publication Data
US 2013/0231431 A1  Sep. 5, 2013

Related U.S. Application Data

(60) Provisional application No. 61/392,856, filed on Oct. 13, 2010.

(30) Foreign Application Priority Data

Mar. 11, 2011 (EP) .................................... 11157968

(51) Int. Cl.
*C08L 77/06* (2006.01)
*C08K 3/22* (2006.01)
*C08K 3/30* (2006.01)
*C08K 7/14* (2006.01)
*C08K 3/00* (2006.01)

(52) U.S. Cl.
CPC ............... *C08L 77/06* (2013.01); *C08K 3/0033* (2013.01); *C08K 7/14* (2013.01); *C08K 2003/2241* (2013.01); *C08K 2003/3036* (2013.01); *C08K 2003/3045* (2013.01)

(58) Field of Classification Search
None
See application file for complete search history.

(56) References Cited

U.S. PATENT DOCUMENTS

| | | | | |
|---|---|---|---|---|
| 4,607,073 | A * | 8/1986 | Sakashita et al. | 524/404 |
| 5,863,974 | A * | 1/1999 | Tjahjadi et al. | 524/412 |
| 6,488,893 | B1 | 12/2002 | Elgarhy et al. | |
| 2004/0034152 | A1* | 2/2004 | Oka et al. | 524/497 |
| 2004/0046279 | A1 | 3/2004 | Studholme | |
| 2005/0183218 | A1 | 8/2005 | Rao | |
| 2006/0293435 | A1* | 12/2006 | Marens et al. | 524/497 |
| 2007/0158220 | A1* | 7/2007 | Cleereman et al. | 206/320 |
| 2007/0161741 | A1* | 7/2007 | Ogasawara | 524/494 |
| 2008/0021143 | A1* | 1/2008 | Thullen et al. | 524/423 |
| 2009/0131569 | A1* | 5/2009 | Schwitter et al. | 524/423 |

FOREIGN PATENT DOCUMENTS

| | | |
|---|---|---|
| EP | 1375578 A1 | 1/2004 |
| WO | WO 2006135841 A1 | 12/2006 |
| WO | WO 2012049254 A1 | 4/2012 |
| WO | WO 2012049255 A1 | 4/2012 |

OTHER PUBLICATIONS

U.S. Appl. No. 13/878,919, Glenn P. Desio, et al.
U.S. Appl. No. 13/878,931, filed Apr. 11, 2013, Glenn P. Desio, et al.
Standard ASTM E308-08, "Standard Practice for Computing the Colors of Objects by Using the CIE System", 2008, ASTM International, A01005581, pp. 1-34; 34 pgs.

* cited by examiner

*Primary Examiner* — Randy Gulakowski
*Assistant Examiner* — Stephen Rieth
(74) *Attorney, Agent, or Firm* — Jarrod N. Raphael

(57) ABSTRACT

The present invention relates to stain- or dye-resistant articles comprising a polymer composition comprising at least one semi-aromatic polyamide comprising recurring units resulting from the condensation of terephthalic acid and at least one aliphatic diamine comprising more than 8 carbon atoms, at least one filler and from 0.1 to 35 wt. % of at least one white pigment, based on the total weight of the composition.

15 Claims, No Drawings

STAIN-RESISTANT ARTICLES

REFERENCE TO RELATED APPLICATIONS

This application claims priority to U.S. application No. 61/392,856 filed on Oct. 13, 2010 and to European application No. 11157968.6 filed on Mar. 11, 2011, the whole content of these applications being incorporated herein by reference for all purposes.

FIELD OF THE INVENTION

The present invention broadly relates to low color articles comprising a semi-aromatic polyamide that feature surprisingly anti-staining properties. The present invention relates in particular to portable electronic device housings comprising a polyamide composition featuring anti-staining properties. The invention relates also in particular to the use of a semi-aromatic polyamide in the manufacture of articles for its anti-staining properties.

BACKGROUND OF THE INVENTION

Semi-aromatic polyamides (like those derived from phthalic acids and aliphatic diamines, i.e. polyphthalamides, or those derived from aromatic diamines and aliphatic diacids) are polymers having excellent mechanical, physical and chemical properties which make them useful for a wide variety of different applications. Besides, they generally feature the benefit of being conveniently molded into a variety of articles of varying degrees of complexity and intricacy.

In particular, semi-aromatic polyamides are good candidates for the manufacture of articles such as portable electronic devices. Portable electronic devices, such as mobile telephones, personal digital assistants, laptop computers, tablet computers, global positioning system receivers, portable games, radios, cameras, camera accessories, and the like are becoming increasingly widely used globally in many different environments. It is often important that the housings of such devices be made from materials that are able to withstand the rigors of frequent use and can meet challenging aesthetic demands while not interfering with their intended operability. It is often desirable that those materials have good stiffness and high impact resistance, and that they exhibit high dimensional stability when they are formed (as by injection molding, for example) into housings.

Many attempts have been made to offer a polyamide material suitable for the manufacture of portable electronic devices housings. Most of them offer a very good balance of properties useful in these specific applications.

However, these prior art housings still suffer from a significant drawback: they are not resistant to staining agents that are often put in contact with these portable electronic devices housings. Typical staining agents include: makeup (such as lipstick, lip gloss, lip liner, lip plumper, lip balm, foundation, powder, blush), artificial or natural colorants (such as those found in soft drinks, coffee, red wine, mustard, ketchup and tomato sauce), dyes and pigments (such as those found in dyed textiles and leather, used for the manufacture of portable electronic devices housings). In contact with these staining agents, the prior art articles, and in particular the portable electronic devices housings are easily stained.

The staining issue of polyamides is known for a long time but in a different application, namely in the field of carpet and textile fibers. Polyamide fibers are relatively inexpensive and offer a desirable combination of qualities such as durability, comfort, and ease of manufacture into a broad range of colors, patterns, and textures. As a result, polyamide fibers are widely used in the home and industry as carpets, drapery material, upholstery, and clothing. Carpets made from polyamide fibers are a popular floor covering for residential and commercial applications.

Polyamide fibers dye easily with dyes. Consequently, carpets made from polyamide fibers stain easily when exposed to dyes or staining agents that exist in some common food and beverages. The resulting stains cannot be easily removed under ordinary cleaning conditions. The severe staining of carpeting is a major problem for consumers. In fact, surveys show that more carpets are replaced because of staining than because of wear.

Many attempts have been made to offer anti-staining polyamide carpets and textiles that resist common household and common stains, thereby increasing their life. For example, one way of avoiding such staining is to topically apply to the surface of the polyamide filaments materials a specific anti-staining agent. U.S. Pat. No. 6,488,893 provides for example a solution comprising condensation product of sulfonated naphthalene sulphonic acid, and aldehyde and a dihydroxydiphenyl sulfone together with a methacrylic acid polymer that function as stain blockers so as to prevent stains from permanently coloring the yarn. Topical treatments, however, tend to be costly and non-permanent (washed away with one or more washings).

It would thus be desirable to obtain articles and in particular housings for portable electronic devices that are made from polyamide compositions having excellent stiffness, high dimensional stability and impact resistance while exhibiting also anti-staining properties.

It is thus a first object of the present invention to provide anti-staining polyamide articles. The polymer composition (C) according to the present invention exhibits outstanding properties: good mechanical properties, high temperature resistance, low water absorption, superior chemical resistance. It can also be easily processed and may be molded into thin walls. In addition, the inventors have surprisingly found that the polymer composition (C) according to the present invention features also outstanding anti-staining properties.

DETAILED DESCRIPTION OF THE INVENTION

In a first aspect, the present invention relates to a stain- or dye-resistant article comprising a polymer composition (C) comprising:
   at least one semi-aromatic polyamide comprising recurring units resulting from the condensation of terephthalic acid and at least one aliphatic diamine comprising more than 8 carbon atoms;
   at least one filler;
   from 0.1 to 35 wt. % of at least one white pigment, based on the total weight of the polymer composition (C);
wherein the color of said article has a lightness (L*) of at least 70 in the CIE 1976 (L*, a*, b*) color space when measured according to ASTM E308-08.

The present invention provides thus articles having excellent mechanical, physical and chemical properties while being also surprisingly stain- or dye-resistant.

In a second aspect, the present invention relates to a method for conferring anti-staining properties to an article comprising using a semi-aromatic polyamide comprising recurring units resulting from the condensation of terephthalic acid and an aliphatic diamine comprising more than 8 carbon atoms.

The article according to the present invention exhibits outstanding anti-staining properties. More precisely, the article according to the present invention has a stain-resistance rating of 1 on the Stain Rating Scale of the Stain Test Method described below. The staining is herein intended to denote a coloration produced by a staining agent that penetrates a material. In many cases, stains can be affected by heat and moisture, and may become reactive enough to bond with the underlying material. Extreme heat can cause a chemical reaction on an otherwise removable stain, turning it into a chemical compound that is impossible to remove.

The staining agent is intended to denote any agent that causes the material that comes in contact with it to stain. Typically, staining agents comprise at least one dye or pigment. Both dyes and pigments appear to be colored because they absorb and reflect some wavelengths of light preferentially. Typical staining agents include: makeup (such as lipstick, lip gloss, lip liner, lip plumper, lip balm, foundation, powder, blush), artificial or natural colorants (such as those found in soft drinks, coffee, red wine, food), dyes and pigments (such as those found in dyed textiles and leather).

The Article

The article according to the present invention has a lightness (L*) of at least 70 in the CIE 1976 (L*, a*, b*) color space when measured according to ASTM E308-08. The procedure used to measure the color and in particular the luminance of the article is detailed here below:

The lightness (L*) was determined using a CE7000 Gretag MacBeth spectrophotometer using Cool White Fluorescent (F2) illuminant, a 10° observer, a 10 nm wavelength interval, a spectral range of from 360 to 700 nm and a D/8 optical geometry configuration with a bandpass correction using table 5.27 of the ASTM E 308-08 (on page 22). Values were measured on CIE Lab coordinates. The three coordinates of CIELAB represent the lightness of the color (L*=0 yields black and L*=100 indicates diffuse white; specular white may be higher), its position between red and green (a*, negative values indicate green while positive values indicate red) and its position between yellow and blue (b*, negative values indicate blue and positive values indicate yellow).

The article according to the present invention has preferably a lightness (L*) of at least 72, more preferably at least 74, still more preferably at least 76, even more preferably of at least 78 and most preferably of at least 80.

The article according to the present invention may be composed of one ore more parts. At least one part of the article comprises the polymer composition (C).

In a first particular embodiment, the article according to the present invention is an electronic equipment housing and more particularly a portable electronic device housing.

By "portable electronic device" is meant an electronic device that is designed to be conveniently transported and used in various locations. Representative examples of portable electronic devices include mobile telephones, personal digital assistants, laptop computers, tablet computers, radios, cameras and camera accessories, watches, calculators, music players, global positioning system receivers, portable games, hard drives and other electronic storage devices, and the like.

By "portable electronic device housing" is meant a cover, backbone, or the like of the device. The housing may be a single article or comprise two or more components. By "backbone" is meant a structural component onto which other components of the device, such as electronics, microprocessors, screens, keyboards and keypads, antennas, battery sockets, and the like are mounted. The backbone may be an interior component that is not visible or only partially visible from the exterior of the telephone. The housing may provide protection for internal components of the device from impact and contamination and/or damage from environmental agents (such as liquids, dust, and the like). Housing components such as covers may also provide substantial or primary structural support for and protection against impact of certain components having exposure to the exterior of the device such as screens and/or antennas. Examples of such housings include but are not limited to: mobile telephones housings, personal digital assistants housings, laptop computers housings, tablet computers housings, global positioning system receivers housings, portable games housings, radios housings, cameras housings, camera accessories housings, etc.

In a preferred embodiment, the housings of the present invention are mobile telephone housings. By "mobile telephone housing" is meant one or more of the back cover, front cover, antenna housing, and/or backbone of a mobile phone. The housing may be a single article incorporating one or more of the foregoing. By "backbone" is meant a structural component onto which other components of the mobile telephone, such as electronics, screens, battery sockets, and the like are mounted. The backbone may be an interior component that is not visible or only partially visible from the exterior of the telephone.

The articles and in particular the housings for portable electronic devices according to the present invention are made from the compositions using any suitable melt-processing method. In particular, the article according to the present invention may be an injection molded article, an extruded molded article, a shaped article, a coated article or a casted article. Injection molding is a preferred method.

In a second particular embodiment, the article according to the present invention is selected from:
- an appliance like a home appliance or household machines such as refrigerators, freezers, blenders, can openers, coffee machines, microwave ovens, convection ovens, mixers, stoves, washing machines, dishwashers, trash compactors and the like;
- a countertop referring to a horizontal worksurface in kitchens or other food preparation areas, bathrooms or lavatories, and workrooms in general;
- furnitures like cabinets, chairs, tables and the like.

The Semi-aromatic Polyamide

The semi-aromatic polyamide according to the present invention comprises recurring units (R) resulting from the condensation of terephthalic acid and at least one aliphatic diamine comprising more than 8 carbon atoms.

Recurring units (R) are advantageously obtained from the condensation of terephthalic acid and at least one aliphatic diamine comprising more than 8 carbon atoms. Preferably, they are obtained from the condensation of terephthalic acid and at least one aliphatic diamine comprising less than 14 carbon atoms, more preferably less than 13 carbon atoms, even more preferably less than 12 carbon atoms. Excellent results were obtained when using one or more aliphatic diamine comprising 9, 10 or 11 carbon atoms.

Suitable aliphatic diamine comprising more than 8 carbon atoms include, but are not limited to, 1,8-octanediamine, 1,9-nonanediamine, 2-methyl-1,8-octanediamine, 1,10-decanediamine, 1,12-dodecanediamine, 2,2,4-trimethyl-1,6-hexanediamine, 2,4,4-trimethyl-1,6-hexanediamine and 5-methyl-1,9-nonanediamine; it may also be an alicyclic diamine, e.g. methylcyclohexanediamine and isophoronediamine.

The aliphatic diamine having more than 8 carbon atoms is preferably a $C_9$-$C_{14}$ diamine, more preferably a $C_9$-$C_{12}$ diamine.

In a particular embodiment, the aliphatic diamine having more than 8 carbon atoms is a C9 diamine in such a case, the diamine may be 1,9-nonanediamine (NDA) and/or 2-methyl-1,8-octanediamine (MODA). The 2-methyl-1,8-octanediamine (MODA) may be present from 0 to 50 mole %, based on the total number of moles of the diamine. When the aliphatic diamine having more than 8 carbon atoms is a mix of NDA and MODA, the molar ratio [(NDA):(MODA)] is advantageously of at least 1, preferably of at least 2, more preferably of at least 3 and still more preferably of at least 4; besides, it is advantageously of at most 9, preferably of at most 7, and more preferably of at most 6.

Excellent results were obtained when the invented polyamide consisted essentially of:
- a diamine component (a) consisting essentially of a mixture of 1,9-nonanediamine and 2-methyl-1,8-octanediamine in a molar ratio [(NDA): (MODA)] of about 1.5 or 5.6, and
- a dicarboxylic acid component (b) consisting essentially of terephthalic acid.

Preferred polyamides are those often referred to as PA 9T, PA 10T and PA 11T and mixtures thereof.

PA 9T, when made using 1,9-nonanediamine, is a polyamide the recurring units of which have the following structure:

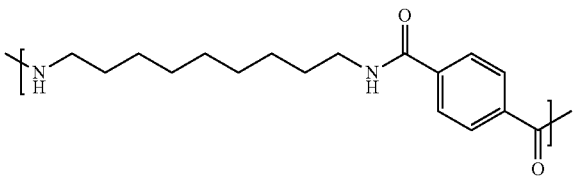

PA 10T is a polyamide the recurring units of which have the following structure:

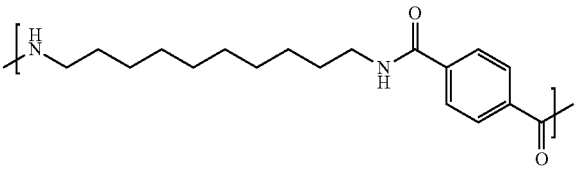

PA10T may be prepared by various ways. It is advantageously prepared at least partially from decanediamine derived from a renewable raw material such as castor bean.

PA 11T is a polyamide the recurring units of which have the following structure:

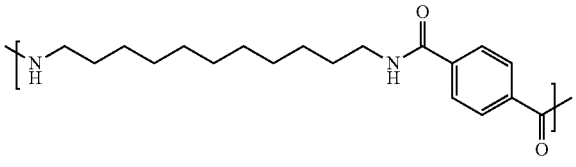

The semi-aromatic polyamide according to the present invention may comprise other recurring units than recurring units (R).

The semi-aromatic polyamide according to the present invention may be obtained by the condensation of one or more dicarboxylic acids and one or more diamines, and/or one or more aminocarboxylic acids, and/or ring-opening polymerization products of one or more cyclic lactams.

In addition to terephthalic acid (abbreviated as "T" in polyamide designations), suitable dicarboxylic acids include, but are not limited to, succinic acid, glutaric acid, sebacic acid, adipic acid, azelaic acid, 1,6-cyclohexanedicarboxylic acid, naphthalenedicarboxylic acid and isophthalic acid (abbreviated as "I" in polyamide designations). Preferably, adipic acid is present in an amount of at most 30 mol %, more preferably at most 20 mol %, even more preferably at most 10 mol %, based on the total number of moles of the diacid component. Most preferably the diacid component is free of adipic acid.

Suitable diamines include, but are not limited to, tetramethylenediamine, hexamethylenediamine, octamethylenediamine, nonamethylenediamine, decamethylenediamine, dodecamethylenediamine, 2-methylpentamethylenediamine, 2-methyloctamethylenediamine, trimethylhexamethylenediamine, bis(p-aminocyclohexyl)methane, m-xylylenediamine, and p-xylylenediamine.

In a particular embodiment, another aliphatic diamine is used in addition to the aliphatic diamine comprising more than 8 carbon atoms. This additional aliphatic diamine may comprise from 6, 7, 8, 9 or 10 carbon atoms. Excellent results were obtained with PA 6T/10T.

The semi-aromatic polyamide according to the present invention comprises preferably at least 20 wt. %, more preferably at least 40 wt. %, even more preferably at least 50 wt. %, still more preferably at least 60 wt. % and most preferably at least 80 wt. % of recurring units (R) based on the total weight of the semi-aromatic polyamide. Excellent results were obtained when the semi-aromatic polyamide was essentially free or even completely free of recurring units other than recurring units (R).

More than one semi-aromatic polyamide may be present in the polymer composition (C). In such a case, the semi-aromatic polyamide comprising recurring units resulting from the condensation of terephthalic acid and at least one aliphatic diamine comprising more than 8 carbon atoms detailed above is present in at least 20 wt. %, more preferably at least 40 wt. %, even more preferably at least 50 wt. %, still more preferably at least 60 wt. % and most preferably at least 70 wt. %, based on the total weight of the semi-aromatic polyamides.

The semi-aromatic polyamide according to the present invention has advantageously a high melting point. Its melting point is preferably above 200° C., more preferably above 240° C., even more preferably above 280° C. and most preferably above 300° C. Excellent results were obtained with a semi-aromatic polyamide featuring a melting point of 316° C.

The semi-aromatic polyamide according to the present invention has advantageously a high heat deflection temperature. Its heat deflection temperature is preferably above 200° C., more preferably above 250° C., even more preferably above 270° C. and most preferably above 290° C. Excellent results were obtained with a semi-aromatic polyamide featuring a heat deflection temperature of 295° C.

The semi-aromatic polyamide according to the present invention having advantageously a high heat deflection temperature and a high melting point, it features therefore excellent high temperature resistance.

The semi-aromatic polyamide according to the present invention is preferably present in the polymer composition (C) in an amount of at least 10 wt. %, more preferably of at least 20 wt. %, still more preferably of at least 30 wt. % and most preferably of at least 40 wt. %, based on the total weight of the polymer composition (C). On the other hand, the semi-aromatic polyamide according to the present invention is preferably present in the polymer composition (C) in an amount of at most 90 wt. %, more preferably at most 80 wt. %, still more preferably of at most 70 wt. % and most preferably of at most 60 wt. %, based on the total weight of the polymer composition (C). Excellent results were obtained when the semi-aromatic polyamide according to the present invention was present in the polymer composition (C) in about 50 wt. %, based on the total weight of the polymer composition (C).

The Filler

The polymer composition (C) further comprises at least one filler. The filler may be selected from the group consisting of fibrous fillers, particulate fillers and mixture thereof.

Examples of such filler include, but are not limited to, glass fiber, carbon fiber, glass fibers having a non-circular cross section, glass flakes, carbon fibers, wollastonite, calcined clay, kaolin, and the like.

In a particular embodiment of the present invention, the filler is preferably a particulate filler. Examples of such particulate filler include carbon black, talc, glass balls, calcium silicate, calcium metasilicate, kaolin, chalk, powdered quartz, alumina, boron nitride, mica, aluminium silicate, calcium carbonate, clay and the like.

In another particular embodiment of the present invention, the filler is preferably a fibrous filler.

The fibrous filler may have a circular or a non-circular cross section having a major axis lying perpendicular to a longitudinal direction of the reinforcing agent and corresponding to the longest linear distance in the cross section. The non-circular cross section has a minor axis corresponding to the longest linear distance in the cross section in a direction perpendicular to the major axis. The ratio of the length of the major axis to that of the minor access is preferably between about 1.5:1 and about 6:1. The ratio is more preferably between about 2:1 and 5:1 and yet more preferably between about 3:1 to about 4:1.

The fibrous reinforcing agent may be glass, carbon fibers, ceramic fibers or other materials. Glass fibers are preferred. The fibrous reinforcing agent may be in the form of long glass fibers, chopped strands, milled short glass fibers, or other suitable forms known to those skilled in the art. Particularly preferred according to the invention are glass fibers having a fiber diameter between 7 and 18 μm, preferably between 9 and 15 μm.

In a further particular embodiment of the present invention, the filler is preferably a mixture of particulate and fibrous filler.

In a preferred embodiment, the polymer composition (C) comprises preferably at least 20 wt. %, more preferably at least 30 wt. %, still more preferably at least 40 wt. % and most preferably at least 45 wt. % of the filler, based on the total weight of the polymer composition (C). On the other hand, the polymer composition (C) comprises preferably at most 80 wt. %, more preferably at most 70 wt. %, still more preferably at most 60 wt. % and most preferably at most 55 wt. % of the filler, based on the total weight of the polymer composition (C).

The Pigment

The polymer composition (C) further comprises from 0.1 to 35 wt. % of at least one white pigment, based on the total weight of the polymer composition (C), different from the above described filler.

Among white pigments, the white pigment according to the present invention is preferably selected from titanium dioxide, barium sulfate, zinc sulfide and mixtures thereof. More preferably, the white pigment is titanium dioxide or zinc sulfide.

The polymer composition (C) comprises advantageously from 0.1 to 35 wt. %, preferably from 1 to 20 wt. %, more preferably from 2 to 10 wt. % and still more preferably from 3 to 8 wt. % of at least one white pigment based on the total weight of the composition.

In addition to the at least one white pigment, the polymer composition (C) may comprise other inorganic and organic pigments. Such pigments are well known from the skilled person and are notably chosen from: iron oxide pigments, chromium oxide green, lead chromate molybdate pigments, cadmium pigments, mixed metal oxide pigments, ultramarine blue, etc.

The total amount of pigments (taking into account both white pigments and other pigments) according to the present invention are preferably present in the composition (C) in an amount of at least 0.1 wt. %, more preferably of at least about 0.5 wt. %, yet more preferably of at least about 3 wt. %, or still more preferably of at least about 4 wt. %, based on the total weight of the polymer composition (C). On the other hand, the pigments according to the present invention are preferably present in the polymer composition (C) in an amount of at most 35 wt. %, more preferably of at most 25 wt. %, yet more preferably of at most 15 wt. %, or still more preferably of at most 10 wt. %, and most preferably of at most 8 wt. %, based on the total weight of the composition. Excellent results were obtained when the pigments were present in the polymer composition (C) in about 5 wt. %, based on the total weight of the polymer composition (C).

Optional Ingredients

The polymer composition (C) may further comprise other ingredients.

For example, the polymer composition (C) may further comprise other polymer(s). In particular, the polymer composition (C) may further comprise other polyamides including aliphatic polyamides such as polyamide 6; polyamide 6,6; polyamide 4,6; polyamide 6,10; polyamide 6,12; polyamide 11; polyamide 12; polyamide 9,10; polyamide 9,12; polyamide 9,13; polyamide 9,14; polyamide 9,15; polyamide 6,16; polyamide 9,36; polyamide 10,10; polyamide 10,12; polyamide 10,13; polyamide 10,14; polyamide 12,10; polyamide 12,12; polyamide 12,13; polyamide 12,14; polyamide 6,14; polyamide 6,13; polyamide 6,15; polyamide 6,16; polyamide 6,13; and semi-aromatic polyamides such as poly(m-xylene adipamide) (polyamide MXD,6), poly(dodecamethylene terephthalamide) (polyamide 12,T), poly(nonamethylene terephthalamide) (polyamide 9,T), hexamethylene adipamide/hexamethylene terephthalamide copolyamide (polyamide 6,T/6,6), hexamethylene terephthalamide.

The polymer composition (C) may optionally further comprise an impact modifier. Preferred impact modifiers include those typically used for polyamides, including carboxyl-substituted polyolefins, which are polyolefins that have carboxylic moieties attached thereto, either on the polyolefin backbone itself or on side chains. By "carboxylic moieties" is meant carboxylic groups such as one or more of dicarboxylic acids, diesters, dicarboxylic monoesters, acid anhydrides, and monocarboxylic acids and esters. Useful impact modifiers include dicarboxyl-substituted polyolefins, which are polyolefins that have dicarboxylic moieties attached thereto, either on the polyolefin backbone itself or on side chains. By 'dicarboxylic moiety' is meant dicarboxylic groups such as one or more of dicarboxylic acids, diesters, dicarboxylic monoesters, and acid anhydrides.

The impact modifier may preferably be based on an ethylene/.alpha.-olefin polyolefin. Diene monomers such as 1,4-butadiene; 1,4-hexadiene; or dicyclopentadiene may optionally be used in the preparation of the polyolefin. Preferred polyolefins include ethylene-propylene-diene (EPDM) polymers made from 1,4-hexadiene and/or dicyclopentadiene and styrene-ethylene-butadiene-styrene (SEBS) polymers. As will be understood by those skilled in the art, the impact modifier may or may not have one or more carboxyl moieties attached thereto.

The carboxyl moiety may be introduced during the preparation of the polyolefin by copolymerizing with an unsaturated carboxyl-containing monomer. Preferred is a copolymer of ethylene and maleic anhydride monoethyl ester. The carboxyl moiety may also be introduced by grafting the polyolefin with an unsaturated compound containing a carboxyl moiety, such as an acid, ester, diacid, diester, acid ester, or anhydride. A preferred grafting agent is maleic anhydride. A preferred impact modifier is an EPDM polymer grafted with maleic anhydride, such as Royaltuf 498, which is commercially available from Chemtura. Blends of polyolefins, such as polyethylene, polypropylene, and EPDM polymers with polyolefins that have been grafted with an unsaturated compound containing a carboxyl moiety may be used as an impact modifier.

Impact modifier is present in the composition in 0 to about 20 weight percent, or preferably in about 3 to about 20 weight percent, or more preferably in about 5 to about 15 weight percent, based on the total weight of the composition.

The polymer composition (C) may further optionally comprise additional additives such as ultraviolet light stabilizers, heat stabilizers, antioxidants, processing aids, lubricants, flame retardants, and/or conductivity additive such as carbon black and carbon nanofibrils.

In a preferred embodiment, the polymer composition (C) comprises:
preferably at least 30 wt. % and more preferably at least 40 wt. % of the at least one semi-aromatic polyamide comprising recurring units resulting from the condensation of terephthalic acid and at least one aliphatic diamine comprising more than 8 carbon atoms;
preferably at least 20 wt. %, more preferably at least 30 wt. %, of the at least one filler;
from 0.1 to 35 wt. % and preferably from 2 to 10 wt. % of at least one white pigment, based on the total weight of the polymer composition (C).

A further embodiment of the present invention relates to a method for conferring anti-staining properties to an article comprising using a semi-aromatic polyamide comprising recurring units resulting from the condensation of terephthalic acid and an aliphatic diamine comprising more than 8 carbon atoms for the manufacture of said article. Such article may be an injection molded article, an extruded molded article, a shaped article, a coated article or a casted article. For example, such article may be selected from the group consisting of mobile telephone housings, personal digital assistants housings, laptop computers housings, tablet computer housings, global positioning system receiver housings, portable game housings, radio housings, cameras housings or camera accessory housings.

The semi-aromatic polyamide preferably used in the manufacture of articles for its anti-staining properties may be PA 9T, PA 10T, PA 11T or mixtures thereof.

In particular, the present invention relates to a method for conferring anti-staining properties to an article comprising using a composition comprising PA 9T, PA 10T, PA 11T or mixtures thereof for the manufacture of said article. The Applicant has surprisingly found out that the use of such compositions in the manufacture of articles reduce dramatically their staining when exposed to external staining agents.

Should the disclosure of any patents, patent applications, and publications which are incorporated herein by reference conflict with the description of the present application to the extent that it may render a term unclear, the present description shall take precedence.

EXAMPLES

Makeup was used as the staining agent. More precisely, the makeup was Maybelline Blush 10 Romantic Plum blush.

This staining agent was tested on various 0.3 cm thick molded plaques made of different materials:
PA 6,6: Zytel® 101 commercialized by E. I. du Pont de Nemours and Company
PA 6T/6,6: AMODEL® A-4122 L WH905 commercialized by SOLVAY ADVANCED POLYMERS, L.L.C.
PA6T/6I/6,6: AMODEL® A-1133 NL WH505 commercialized by SOLVAY ADVANCED POLYMERS, L.L.C.
PA 10,10: Commercially available from Shandong Dongchen Engineering Plastic Co., Ltd.
PA 10,12: Commercially available from Shandong Dongchen Engineering Plastic Co., Ltd.
PA 9T: polymer obtained by the condensation of C9 aliphatic diamine and terephthalic acid, supplied by Kuraray.
PA 10T: Vicnyl 700 commercialized by Kingfa.
Glass fiber: CSG3PA-820 commercialized by Nitobo.
Colored pigments: a mixture of pigments were used for color matching.
White pigment I: zinc sulfide: Sachtolith® HD-L commercialized by Sachtleben Chemie GmbH.
White pigment II: titanium dioxide: R-105 commercialized by DuPont Titanium Technologies.
Talc: Steamic® OOS commercialized by Talc de Luzenac France.
Sebum: Synthetic sebum commercialized by Scientific Services.

TABLE 1

Materials tested

|  | CE1 | CE2 | CE3 | CE4 | CE5 | E1 | E2 |
|---|---|---|---|---|---|---|---|
| Polyamide |  |  |  |  |  |  |  |
| PA 6,6 | 50 |  |  |  |  |  |  |
| PA 6T/6,6 |  | 66 |  |  |  |  |  |
| PA 6T/6I/6,6 |  |  | 58.7 |  |  |  |  |
| PA 10,10 |  |  |  | 46.22 |  |  |  |
| PA 10,12 |  |  |  |  | 46.22 |  |  |
| PA 9T |  |  |  |  |  | 46.22 |  |
| PA 10T |  |  |  |  |  |  | 46.22 |
| Filler |  |  |  |  |  |  |  |
| Glass fiber | 50 | 21 | 34.5 | 47.26 | 47.26 | 47.26 | 47.26 |
| Pigments |  |  |  |  |  |  |  |
| Colored pigments |  |  |  | 0.025 | 0.025 | 0.025 | 0.025 |
| White pigment I |  |  |  | 4.755 | 4.755 | 4.755 | 4.755 |
| White pigment II |  | 12 | 6 |  |  |  |  |
| Additives |  |  |  |  |  |  |  |
| Typical PA additives |  | 1 | 0.5 | 0.74 | 0.74 | 0.74 | 0.74 |
| Talc |  |  | 0.3 | 1 | 1 | 1 | 1 |

Staining Test Method

The color of the plaques were measured, and in particular the lightness (L*) of the samples were determined using a CE7000 Gretag MacBeth spectrophotometer using Cool White Fluorescent (F2) illuminant and the 10° observer, as detailed above.

The following test procedure was used to determine the stain-resistance performance of examples of this invention, this test method simulates a potential real life method of staining whereby a person wearing makeup talking on their cell phone may introduce colorants to the plastic cell phone part. Synthetic face oil, sebum, was used to simulate a possible carrier or solvent for the dyes.

A mixture of staining agent is prepared by heating sebum until it is liquid, then mixing 3 parts of the heated sebum to one part of the makeup and finally heating the mixture to maintain liquidity.

The prepared staining agent mixture is applied to the surface of the molded plaques with a cotton swab. The plaques are placed in an environmental chamber at 65° C. and 90% humidity for 24 hours. The molded plaques are then placed at room temperature before wiping their surface with isopropyl alcohol. Once cleaned, the plaques are finally inspected for staining.

The inspection step comprises the measurement of the lightness (L*), as detailed above. The difference between the original L* measured and the L* measured after the staining treatment is calculated.

Stain Rating Scale: the stains can be categorized according to the following standards:
1=no staining=$\Delta L \leq 0.5$
2=moderate staining=$0.5 < \Delta L < 5$
3=heavy staining=$\Delta L > 5$ In other words, a stain-rating of 1 is excellent, showing good stain resistance, whereas 3 is a poor rating, showing persistence of heavy staining. For a substrate to be considered to have adequate stain resistance, it should have a rating of 1 on the above-described Stain Rating Scale.

TABLE 2

Staining test results

|  | CE1 | CE2 | CE3 | CE4 | CE5 | E1 | E2 |
|---|---|---|---|---|---|---|---|
| Initial L* value | 61.6 | 91.0 | 93.9 | 90.9 | 90.8 | 89.7 | 89.4 |
| L* value after staining treatment | 58.4 | 90.0 | 92.7 | 84.3 | 84 | 89.7 | 89.0 |
| Staining rating | 2 | 2 | 2 | 3 | 3 | 1 | 1 |

The invention claimed is:

1. An external surface of a mobile telephone comprising a polymer composition (C) comprising:
    at least one semi-aromatic polyamide comprising recurring units resulting from the condensation of terephthalic acid and at least one aliphatic diamine comprising 9 or 10 carbon atoms;
    from 30 to 80 wt. of at least one filler;
    from 0.1 to 35 wt. of at least one white pigment, based on the total weight of the polymer composition (C);
    wherein the color of the external surface has a lightness (L*) of at least 70 in the CIE 1976 (L*, a*, b*) color space when measured according to ASTM E308-08.

2. The external surface according to claim 1, wherein the semi-aromatic polyamide is selected from the group consisting of PA9T, PA10T, and mixtures thereof.

3. The external surface according to claim 1, wherein the polymer composition (C) comprises at least 40 wt. % of the semi-aromatic polyamide, based on the total weight of the polymer composition (C).

4. The external surface according to claim 1, wherein the polymer composition (C) comprises from 40 wt. % to 80 wt. % of the at least one filler, based on the total weight of the polymer composition (C).

5. The external surface according to claim 1, wherein the polymer composition (C) comprises from 1 wt. % to 35 wt. % of the at least one white pigment, based on the total weight of the polymer composition (C).

6. The external surface according to claim 1, wherein the filler is glass fiber.

7. The external surface according to claim 1, wherein the white pigment is selected from the group consisting of titanium dioxide, barium sulfate, zinc sulfide and mixtures thereof.

8. The external surface according to claim 1 having a stain-resistance rating of 1 on the Stain Rating Scale of the Stain Test Method.

9. The external surface according to claim 1 wherein the external surface is made by injection molding, extrusion, shaping, coating, or casting the polymer composition (C).

10. The external surface according to claim 2, wherein the semi-aromatic polyamide is PA9T.

11. The external surface according to claim 2, wherein the semi-aromatic polyamide is PA10T.

12. The external surface of claim 1, wherein the at least one aliphatic diamine comprises 1,9-nonanediamine, 2-methyl-1,8-octanediamine, 1,10-decanediamine or a combination thereof.

13. The external surface of claim 1, wherein the at least one white pigment comprises zinc sulfide.

14. A method for forming the external surface of claim 1, the method comprising processing the polymer composition (C) to form the external surface.

15. The method according to claim 14, wherein the processing is performed by injection molding, extrusion, shaping, coating, or casting the polymer composition (C).

* * * * *